United States Patent
Mizumoto

(10) Patent No.: US 6,409,597 B1
(45) Date of Patent: Jun. 25, 2002

(54) VIDEO GAME MACHINE, SCREEN DISPLAY METHOD FOR VIDEO GAME, AND RECORDING MEDIUM CONTAINING SCREEN DISPLAY PROGRAM

(75) Inventor: Toru Mizumoto, Kobe (JP)

(73) Assignee: Konami Co., Ltd., Kobe (JP)

( * ) Notice: Subject to any disclaimer, the term of this patent is extended or adjusted under 35 U.S.C. 154(b) by 0 days.

(21) Appl. No.: 09/237,271

(22) Filed: Jan. 25, 1999

(30) Foreign Application Priority Data

Jan. 28, 1998 (JP) .......................................... 10-016203

(51) Int. Cl.⁷ ............................................... A63F 13/00
(52) U.S. Cl. ............................... 463/31; 463/32; 463/6; 463/7
(58) Field of Search ........................... 463/6, 7, 30, 31, 463/32, 33, 34, 36, 37–38, 43, 47

(56) References Cited

U.S. PATENT DOCUMENTS

| | | | |
|---|---|---|---|
| 5,269,687 A | * 12/1993 | Mott et al. ..................... | 434/69 |
| 5,415,549 A | 5/1995 | Logg | |
| 5,769,718 A | * 6/1998 | Rieder ......................... | 463/31 |
| 5,830,066 A | * 11/1998 | Goden et al. .................. | 463/33 |
| 6,010,403 A | * 1/2000 | Adam et al. .................... | 463/6 |
| 6,117,007 A | * 9/2000 | Matsuyama et al. ........... | 463/6 |
| 6,139,433 A | * 10/2000 | Miyamoto et al. ............. | 463/32 |
| 6,139,434 A | * 10/2000 | Miyamoto et al. ............. | 463/32 |
| 6,175,366 B1 | * 1/2001 | Watanabe et al. ........... | 345/422 |
| 6,283,857 B1 | * 9/2001 | Miyamoto et al. ............. | 463/31 |

FOREIGN PATENT DOCUMENTS

| | | |
|---|---|---|
| EP | 07178242 | 7/1995 |
| EP | 08329273 | 12/1996 |
| EP | 09167256 | 6/1997 |
| EP | 0782104 | 7/1997 |
| EP | 0801363 | 10/1997 |
| EP | 0844587 | 5/1998 |
| JP | 07-155472 | 6/1995 |
| JP | 09-050541 | 2/1997 |
| JP | 09-070481 | 3/1997 |
| WO | WO 97/36261 | 10/1997 |
| WO | WO 97/46295 | 12/1997 |
| WO | WO 97/46970 | 12/1997 |

\* cited by examiner

*Primary Examiner*—Joe H. Cheng
*Assistant Examiner*—Scott E. Jones
(74) *Attorney, Agent, or Firm*—Jordan and Hamburg LLP

(57) ABSTRACT

A video game machine includes a viewpoint-position control unit. The viewpoint-position control unit uses a rendering unit to set a position of a viewpoint when a player's car is displayed in a game screen on a monitor. The viewpoint is positioned behind and slightly above the player's car, and is moved along viewpoint positions provided in a world coordinate system. A viewpoint closest to the player's car corresponds to zero points, and a viewpoint farthest from the player's car corresponds to 500 points. Set points for the viewpoint are provided in accordance with whether each viewpoint condition is satisfied. In the case where the present points for the viewpoint differ from the set points when each viewpoint condition is satisfied, the viewpoint is moved at a moving speed based on a number of points per frame.

52 Claims, 16 Drawing Sheets

WORLD COORDINATE SYSTEM

LOCAL COORDINATE SYSTEM

VIDEO GAME MACHINE, SCREEN DISPLAY METHOD FOR VIDEO GAME, AND RECORDING MEDIUM CONTAINING SCREEN DISPLAY PROGRAM

BACKGROUND OF THE INVENTION

The present invention relates to video game machines for displaying, in real time on a monitor, images changed when a virtual game character is manipulated to move by a player, image display methods for a video game, and recording media containing a screen display program.

Many game systems have been proposed, such as a system comprised of a home-use game console and a television monitor, a commercial-use game machine, and a system comprised of a personal computer or work station, a display, and a sound output device.

The game systems each include a player-operated controller, a recording medium containing a game program, a central processing unit (CPU) for performing control for the generation of sound and images based on the game program, a processor for generating images, a processor for generating sound, a monitor for displaying images, and a speaker for outputting the generated sound. The types of recording medium include a compact-disk read-only memory (CD-ROM), a semiconductor memory, and a cassette having a built-in semiconductor memory.

In a type of video game played using the game systems, a game space is a virtual world in which there are streets, forest, etc., and a game character is moved in the game space by operating a controller.

In this type of video game, by using a virtual camera (hereinafter referred to as a "viewpoint") disposed at a predetermined position with respect to the game character, an image including the character is displayed on a monitor. In addition, a game in which a viewpoint can be shifted to a plurality of predetermined positions with respect to the character by a player operating a viewpoint-shift button provided on a controller is known.

The conventional video games of the above-described types have the function of simply shifting the viewpoint with respect to the game character to the predetermined positions in accordance with the operation of the viewpoint-shift button. Accordingly, the condition of the game character moving in the game space cannot always be observed from a preferable viewpoint, which prevents the player from experiencing sufficient virtual reality. The player also is inconvenienced by complicated operations since the player must operate the viewpoint-shift button while manipulating the game character in order to view the condition of the game character from the preferable viewpoint.

SUMMARY OF THE INVENTION

Accordingly, it is an object of the present invention to provide a video game machine for causing a player to experience enhanced virtual reality obtained by automatically shifting a viewpoint in a game screen on a display in accordance with the condition of a game character, a screen display method for a video game, and a recording medium containing a screen display program.

To this end, according to an aspect of the present invention, the foregoing object has been achieved through provision of a video game machine comprising: operation means for outputting an operation signal when the operation means is externally operated, the operation signal corresponding to the type of operation; motion-control means for moving a game character in a game space in accordance with the operation signal; rendering means for displaying, on a displaying means, an image including the game character, while using a predetermined position set with respect to the game character as a viewpoint; condition storage means for storing a predetermined viewpoint condition, and a selected position provided in accordance with the predetermined viewpoint condition; condition determination means for determining whether the predetermined viewpoint condition is satisfied; and viewpoint-position control means for moving the viewpoint to each selected position when the predetermined viewpoint condition is satisfied.

Preferably, the predetermined viewpoint condition is provided for an action by the game character.

The game character may be a moving object, and the predetermined viewpoint condition may be that the moving object has spun.

The game character may be a moving object, and the predetermined viewpoint condition may be that the moving object has crashed.

The viewpoint condition may be provided based on the positional relationship between a predetermined obstacle provided in the game space and the game character, and the condition determination means may determine that the viewpoint condition is satisfied when the game character is positioned within a predetermined range including the obstacle.

The video game machine may further include a table storage means for storing a table provided for coordinates in the game space, and an area corresponding to the predetermined range in the table, and the condition determination means may perform determination based on the correspondence between the coordinates of the game character in the game space and the area.

The video game machine may further include range storage means for storing coordinates in the predetermined range in the game space, and the condition determination means may perform determination when the coordinates of the game character in the game space are included in the predetermined range.

The viewpoint condition may be provided based on the positional relationship between a predetermined obstacle provided in the game space and the game character, and the condition determination means may determine that the viewpoint condition is satisfied when the obstacle is positioned between the game character and the present position of the viewpoint.

The viewpoint may be provided behind the game character which is moving.

When the viewpoint condition is satisfied and the position of the viewpoint differs from the selected position, the viewpoint-position control means may move the viewpoint to the selected position at a predetermined speed.

The condition storage means may store a plurality of viewpoint conditions and a plurality of selected positions corresponding to the plurality of viewpoint conditions, and the viewpoint-position control means may move the viewpoint to the selected position corresponding to one of the viewpoint conditions which is determined by the viewpoint condition means to be satisfied.

According to another aspect of the present invention, the foregoing object has been achieved through provision of a screen display method for a video game in which a game screen including a game character moved in a game space in accordance with an external operation is displayed on a display means, with a predetermined position to the game character used as a viewpoint, wherein when a predetermined viewpoint condition is satisfied, the viewpoint is moved to a selected position corresponding to the viewpoint condition.

According to a further aspect of the present invention, the foregoing object has been achieved through provision of a recording medium containing a screen display program for a video game in which a game screen including a game character moved in a game space in accordance with an external operation is displayed on a display means, with a predetermined position to the game character used as a viewpoint, the screen display program comprising: a condition determination step for determining whether a predetermined viewpoint condition is satisfied; and a viewpoint moving step for moving the viewpoint to a selected position corresponding to the viewpoint condition when the viewpoint condition is satisfied.

According to the present invention, it is determined whether a predetermined viewpoint condition is satisfied, and when the viewpoint condition is satisfied, a viewpoint is moved to a selected position corresponding to the viewpoint condition, whereby the condition of the character which is moving can be displayed, with the viewpoint always positioned at a preferable position.

According to the present invention, a viewpoint condition may be provided for an action by a game character. This can move a viewpoint close or away in accordance with the action by the character.

According to the present invention, a game character may be a moving object, and a viewpoint condition may be that the moving object has spun. Therefore, by, for example, moving a viewpoint away, the surroundings of a spinning automobile can be clarified.

According to the present invention, a game character may be a moving object, and a predetermined viewpoint condition may be that the moving object has crashed. Therefore, by, for example, moving the viewpoint close to the character, an appealing image in which an automobile crashes can be displayed.

According to the present invention, a viewpoint condition may be provided based on the positional relationship between a predetermined obstacle provided in a game space and a game character, and it may be determined that the viewpoint condition is satisfied when the character is positioned within a predetermined range including an obstacle. Therefore, when the character is positioned within a predetermined range in the game space, the viewpoint is moved to a selected position, whereby it is prevented that the character cannot be clearly seen.

According to the present invention, a table provided for coordinates in a game space, and an area corresponding to the predetermined range in the table, are stored, and obstacle determination is performed based on the correspondence between the coordinates of a game character in the game space and the area. Therefore, the determination is performed based on whether the coordinates of the character in the game space correspond to the area, whereby it is securely, easily determined whether the character is positioned in the predetermined range.

According to the present invention, coordinates in a predetermined range in a game space are stored, and obstacle determination is determined based on whether the coordinates of a game character in the game space are included in the predetermined range. Therefore, the determination is performed based on whether the coordinates of the character in the game space are included in the predetermined range, whereby it is securely, easily determined whether the character is positioned in the predetermined range.

According to the present invention, a viewpoint condition may be provided based on the positional relationship between a predetermined obstacle provided in a game space and a game character, and it may be determined that the viewpoint condition is satisfied when the obstacle is positioned between the character and the present position of the viewpoint. Therefore, the viewpoint is moved to a selected position when an obstacle is positioned between the character and the present position of the viewpoint, whereby it is prevented that the character cannot be clearly seen.

According to the present invention, at least one of the moving direction and moving speed of a game character is detected, and before an obstacle is positioned between the character and the present viewpoint position, at least one of the moving direction and moving speed of the character may be taken into consideration so that a viewpoint starts to move.

According to the present invention, a viewpoint may be provided behind a game character which is moving. Therefore, the moving direction, etc., of the character can be clearly displayed.

According to the present invention, when a viewpoint condition is satisfied and the position of a viewpoint differs from a selected position, the viewpoint may be moved to the selected position at a predetermined speed. Therefore, the viewpoint is moved at the predetermined speed to the selected predetermined position in accordance with the viewpoint condition, whereby an image in which the view range changes in accordance with the motion of the viewpoint is displayed.

According to the present invention, a plurality of viewpoint conditions and a plurality of selected positions corresponding to the plurality of viewpoint conditions, are stored, and a viewpoint may be moved to the selected position corresponding to one of the viewpoint conditions which is determined to be satisfied. Therefore, the viewpoint is moved at a predetermined speed to each selected position corresponding to each viewpoint condition, whereby an image is displayed, with the viewpoint positioned at a preferable position in accordance with each condition of the character.

DESCRIPTION OF THE PREFERRED EMBODIMENT

Figure 20:
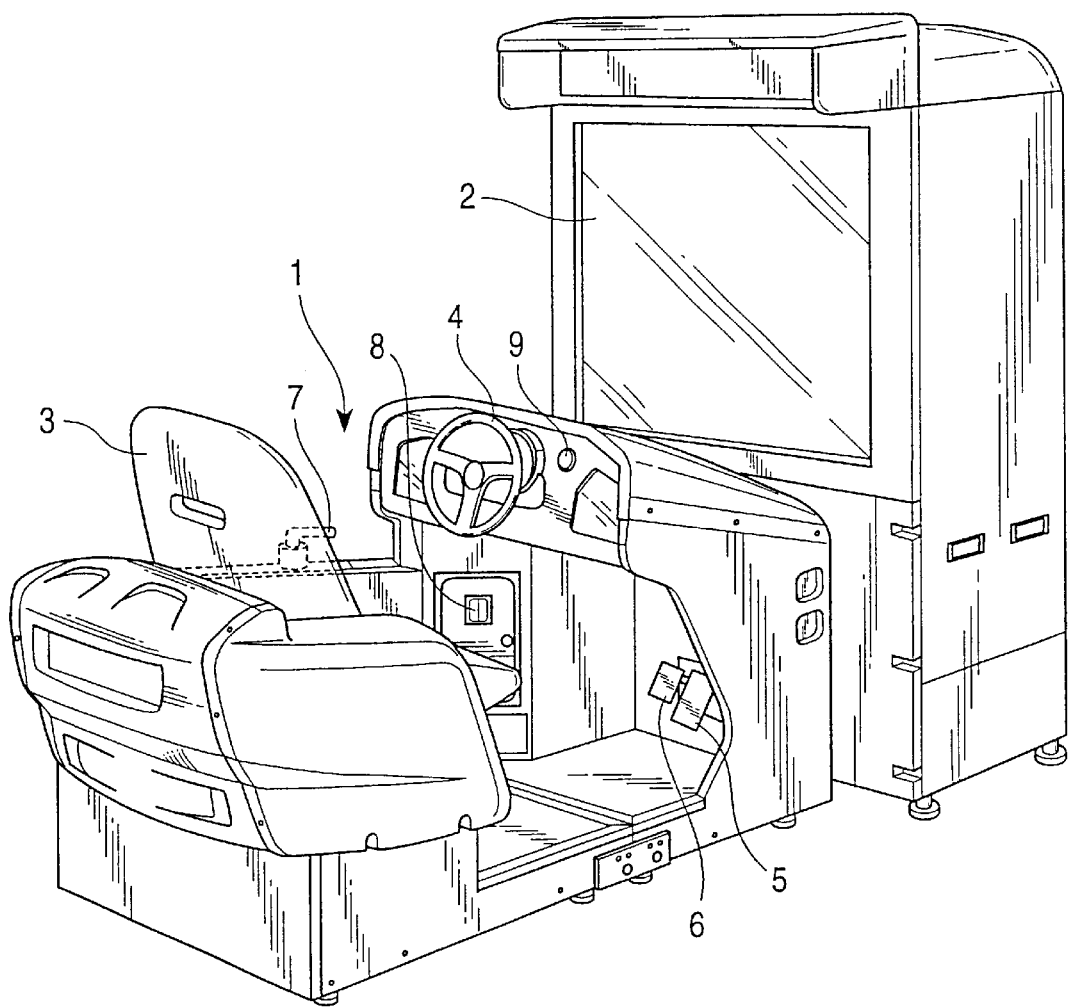
FIG. 20 is a perspective exterior view showing a video game machine according to an embodiment of the present invention.

FIG. 20 shows the exterior of a video game machine according to an embodiment of the present invention.

The video game machine comprises a cab 1 and a monitor 2. The cab 1 includes a seat 3, a steering wheel 4, an accelerator pedal 5, a brake pedal 6, and a hand brake 7, similar to those in the cab of an automobile. In the cab 1, a coin slot 8 is provided on the front left of the seat 3, and a start switch 9 for initiating the game is provided on the horizontal right of the steering wheel 4. The monitor 2 is positioned so as be easily viewed by a player sitting on the seat 3, and includes a cathode-ray tube, a liquid crystal display, or a projector for displaying images.

In this embodiment, two of the video game machines are connectable by a communication cable (not shown), and two players compete with each other in a competition between a moving object (representing an automobile in this embodiment; the automobile is hereinafter referred to as the "player's car") as a player-manipulated game character displayed on the monitor 2, and another moving object (representing an automobile in this embodiment; the automobile is hereinafter referred to as the "enemy car") as an opponent-manipulated game character.

Figure 21:
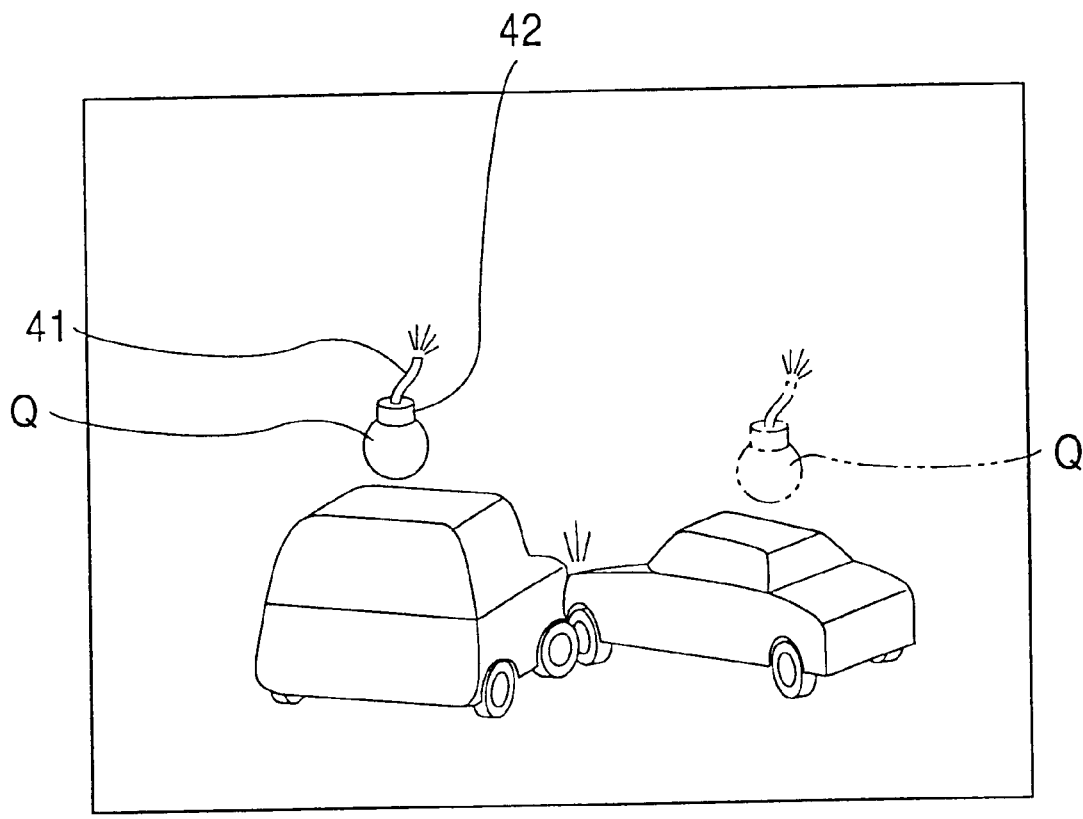
FIG. 21 is a drawing showing one game screen displayed on a monitor and coordinate systems used in a game according to the present invention.
Figure 21:
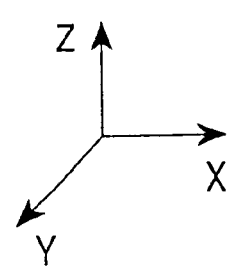
Figure 21:
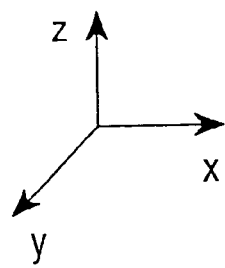

An outline of the game played in the video game machine is described with reference to FIG. 21. FIG. 21 shows a game screen displayed on the monitor 2, and coordinate systems used in the video game.

In the video game, the players play tag in which there is one automobile corresponding to a "tagger", and the tagger is switched by the player-manipulated automobiles touching each other. Above the automobile corresponding to the tagger, a time bomb Q having a fuse 41 is displayed. When the tagger is switched by contact, the position of the displayed time bomb Q is shifted to above the automobile as the new tagger, as represented by the two-dot chain line shown in FIG. 21.

In the video game, a field representing the entire space expressed in computer graphics includes streets, warehouses, grasslands, and forests. Around the streets, virtual models such as warehouses and buildings, in other words, objects displayed in computer graphics, are provided, and the automobiles are manipulated to run along the objects.

The three-dimensional, X-, Y-, and Z-world coordinate system shown in FIG. 21 is used in the field. The streets, etc., are described using the world coordinate system. The three-dimensional, x-, y-, and z-local coordinate system shown in FIG. 21 is used in part of the space in the field. Information such as the shape and position of each model such as a building is described using the x-, y-, z-local coordinate system provided for each information. Control of ordinary automobile travel and determination of collision between automobiles (described below) are performed using only two-dimensional, X- and Y-coordinate data, whereby the speed of arithmetic operation is increased.

Figure 1:
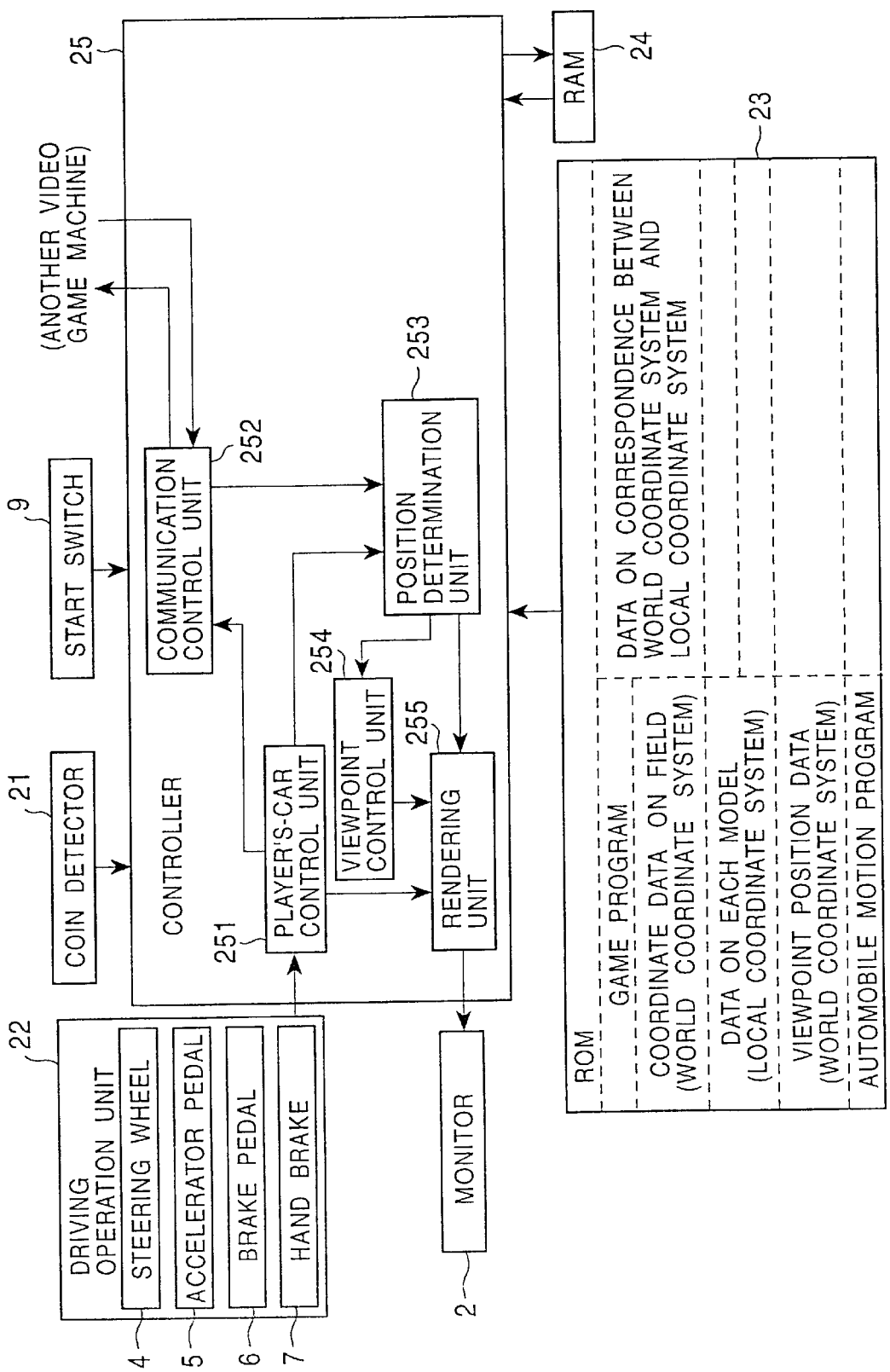
FIG. 1 is a block diagram showing the control system of a video game machine according to an embodiment of the present invention.
Figure 2:
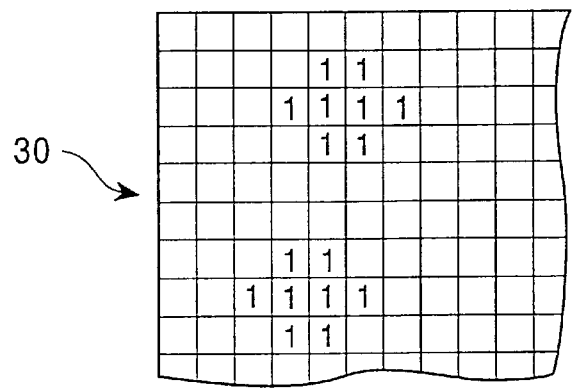
FIG. 2 is an obstacle table stored in a read-only memory.

FIG. 1 shows a block diagram of a control system for the video games according to this embodiment. FIG. 2 shows an obstacle table stored in a read-only memory (ROM).

As shown in FIG. 1, the control system includes the monitor 2, the start switch 9, a coin detector 21, a driving operation unit 22, a ROM 23, a random-access memory 24, and a controller 25. The controller 25 includes an automatic control unit 251 (player's-car control unit), a communication control unit 252, a position determination unit 253, a viewpoint-position control unit 254, and a rendering unit 255.

The start switch 9 is operated by the player. When the start switch 9 is turned on by the player, a switching signal representing activation is sent to the controller 25. The coin detector 21 detects a coin inserted into the coin slot 8 (shown in FIG. 20), and a detection signal from the coin detector 21 is sent to the controller 25.

The driving operation unit 22 includes the steering wheel 4, the accelerator pedal 5, the brake pedal 6, and the hand brake 7. Operation data such as an angle of rotation of the steering wheel 4, the amount of depression of the accelerator pedal 5, the amount of depression of the brake pedal 6, and the amount of operation of the hand brake 7, are converted into voltages having corresponding levels before being sent to the automatic control unit 251.

In the ROM 23, the program of the video game, coordinate data of the field based on the world coordinate system, coordinate data of each model based on the local coordinate system, a program related to motions of each automobile based on automotive engineering, and data on the correspondence between the world coordinate system and the local coordinate system, are stored.

In the ROM 23, which includes a table storage means and a condition storage means, viewpoint-pointing data based on the world coordinate system, viewpoint conditions, and selected positions set in accordance with the viewpoint conditions (described below), and an obstacle table 30 (shown in FIG. 2), are stored. The RAM 24 is a temporary data storage unit.

The obstacle table 30 (shown in FIG. 2) is set to correspond to two-dimensional coordinates. One section of the obstacle table 30 corresponds to, for example, an area of 1 (1 mm$^2$) in the field. The data of sections in a predetermined area are set to ones. The predetermined area includes sections corresponding to the coordinates of a model such as a tree or building that acts as an obstacle when the player's car is viewed from the viewpoint. The data of the other sections are set to zeros.

Referring back to FIG. 1, the controller 25 includes a CPU or logic circuit. The controller 25 performs various operations in a predetermined sampling cycle, and uses the operation results to control each unit and to display an image on the monitor 2. The controller 25 determines that a coin is inserted into the coin slot 8 (shown in FIG. 20) when receiving a detection signal sent from the coin detector 21, and determines that the start switch 9 is turned on by the player when receiving a switching signal sent from the start switch 9.

The automatic control unit 251 in the controller 25 controls the driving of the player's car, using operation data on each unit from the driving operation unit 22, and the automobile motion program based on automobile engineering, which is stored in the ROM 23.

The communication control unit 252 transmits, to the other video game machine, coordinate data on the position of the player's car detected by the automatic control unit 251, and receives and sends coordinate data on the position of the automobile controlled by the other video game machine, namely, the enemy car, to the position determination unit 253.

Figure 3:
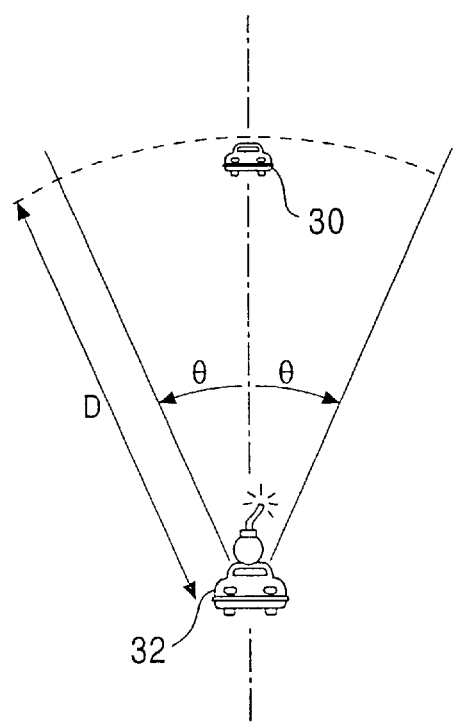
FIG. 3 is a drawing showing one game screen.
Figure 4:
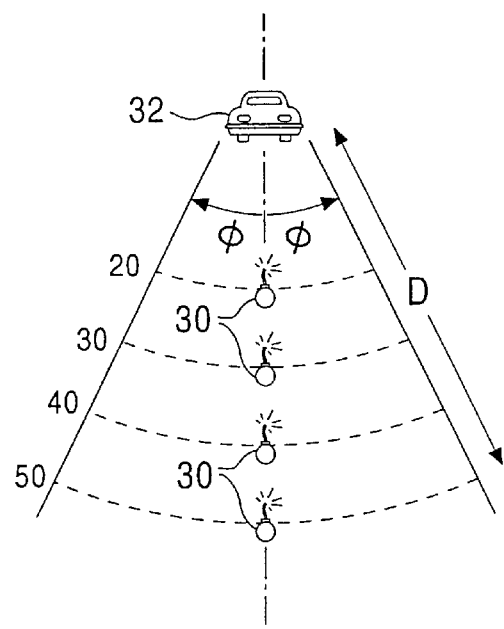
FIG. 4 is a drawing showing one game screen.

The position determination unit 253 is described with reference to FIGS. 1 to 4. FIG. 3 illustrates a situation in which the enemy car is found in front of the player's car. FIG. 4 illustrates a situation in which the player's car is found by the enemy car, which runs backward.

The position determination unit 253 determines positional relationship such as contact or collision between the player's car and the enemy car, using the coordinate data on the player's car and the enemy car sent from the automatic control unit 251 and the communication control unit 252, and also has the following functions (1) to (5).

(1) The position determination unit 253 recognizes the automobile corresponding to the tagger. If it has determined that the automobile corresponding to the tagger has touched the other automobile, it determines that the tagger is shifted to the other automobile. The determination is performed when the two automobiles are in contact for not less than a predetermined time (e.g., 0.3 seconds).

(2) The position determination unit 253 functions as an obstacle determination means. In other words, it recognizes that the data of the sections in the obstacle table 30 (shown in FIG. 2) corresponding to the coordinate data on the player's car are zeros or ones. If it has recognized that the data are zeros, it determines that there is no obstacle, and if it has recognized that the data are ones, it determines that there is an obstacle. Subsequently, it sends the determination result to the viewpoint-position control unit 254.

(3) The position determination unit 253 functions as a spin determination means or crash determination means. In other words, it determines the positional relationship between the player's car and an edge of a road, and determines whether the player's car touches or collides with the edge of the road, whereby determining that the player's car has spun or fallen from a cliff to crash against the ground due to the contact or collision. It also sends, to the viewpoint-position control unit 254 and the rendering unit 255, a spin signal if the player's car has spun, and a crash signal if the player's car has crashed.

(4) The position determination unit 253 determines whether the enemy car is found in front when the player's car is a tagger. As shown in FIG. 3, when distance D between an enemy car 30 and a player's car 32 is within a predetermined value (e.g., 50 meters in this embodiment), and the enemy car 30 is within predetermined horizontal angle (e.g.,=30° in this embodiment) from the front of the player's car 32, it determines that an enemy car 30 is detected.

(5) The position determination unit 253 determines whether the player's car is found by the enemy car behind when the enemy car is a tagger. As shown in FIG. 4, when distance D between an enemy car 30 and a player's car 32 is within a predetermined value (e.g., 50 meters in this embodiment), and the opponent 30 is within predetermined horizontal angle φ (e.g., φ=30° in this embodiment) from the rear of the player's car 32, it determines that the player's car 32 is found by the enemy car 30. In FIG. 4, the enemy car 30 is represented by a time bomb for convenience of description.

Figure 5:
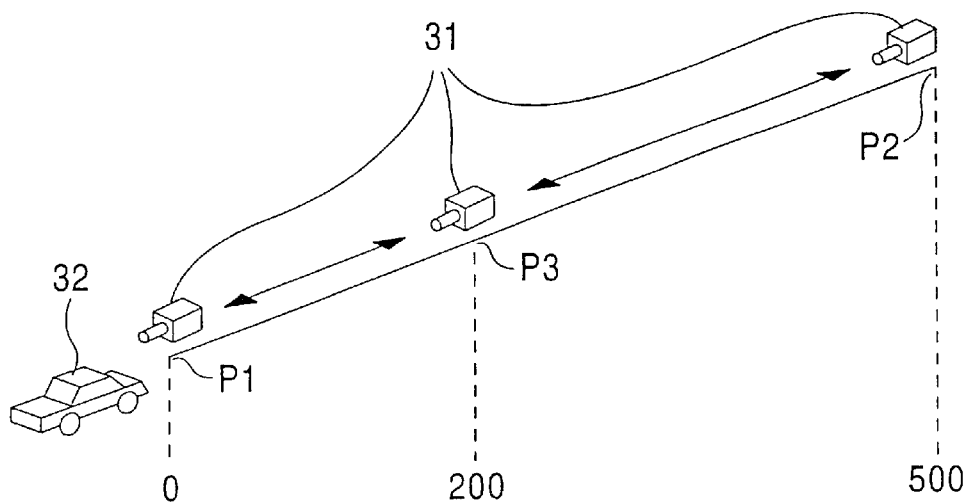
FIG. 5 is a drawing showing one game screen.

With reference to FIG. 1 and FIGS. 4 to 14, the viewpoint-position control unit 254 is described. FIG. 5 shows a moving range of the viewpoint. FIGS. 6 to 14 show screens of the video game, respectively.

The viewpoint-position control unit 254 sets the position of the viewpoint when the player's car is displayed on the monitor 2 by the rendering unit 255.

The viewpoint is positioned behind and slightly above the player's car. The direction of the viewpoint is set to correspond to the direction of the player's car. An angle of view is set to horizontal angle (e.g., ±30° in this embodiment) with respect to the direction of the player's car. A range of view is determined by the angle of view and the distance from the viewpoint.

In FIG. 5, a viewpoint 31 represented by the camera is moved along the viewpoint positions based on the world coordinate system.

Closest point P1 closest to the player's car 32 corresponds to zero points, and farthest point P2 farthest to the player's car 32 corresponds to 500 points.

Point GP (set position) of the viewpoint is determined by satisfying or not satisfying predetermined viewpoint conditions. In the case where present point NP of the viewpoint differs from set point GP when the viewpoint conditions are satisfied, the viewpoint moves at moving speed MS (points/frame) set by the number of points per frame.

The viewpoint-position control unit 254 has the following viewpoint conditions (1) to (7).

(1) It does not move the viewpoint for a predetermined time (e.g., 5 seconds in this embodiment) from the game start. This prevents the player from getting confused by the motion of the viewpoint at the game start.

Figure 6:
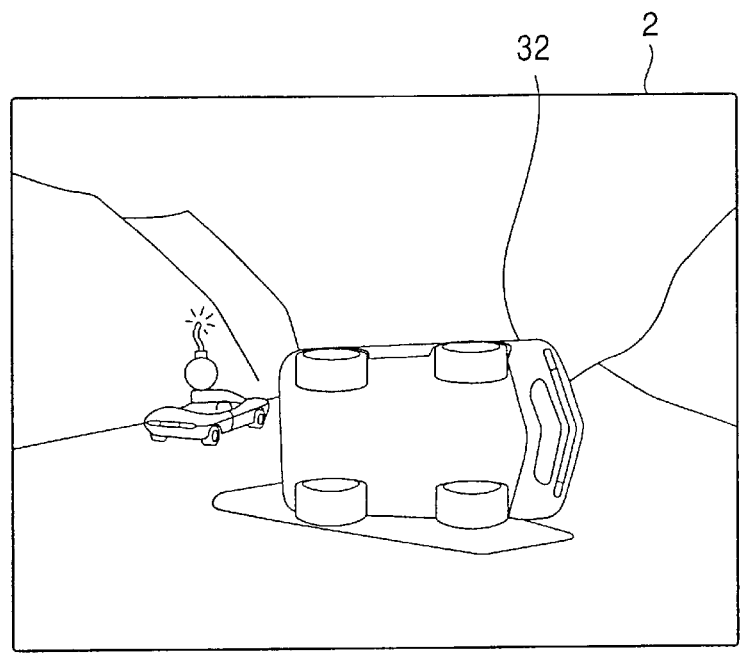
FIG. 6 is a drawing showing one game screen.

(2) If the position determination unit 253 has determined that the player's car has crashed, the viewpoint is positioned to be the closest to the player's car 32 by setting set point GP at zero, and moving speed MS at 4. This displays an impressive image of the player's car 32 having crashed, as shown in FIG. 6.

(3) If the position determination unit 253 has determined that the player's car approaches an obstacle such as a tree or building, the viewpoint is positioned to quickly approach the player's car 32 by setting set point GP at 35, and moving speed MS at 10.

Figure 7:
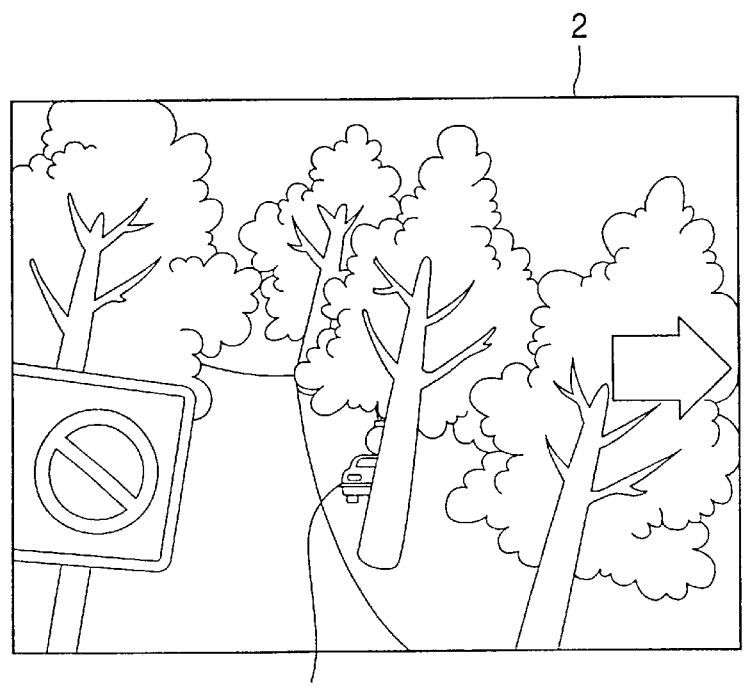
FIG. 7 is a drawing showing one game screen.
Figure 8:
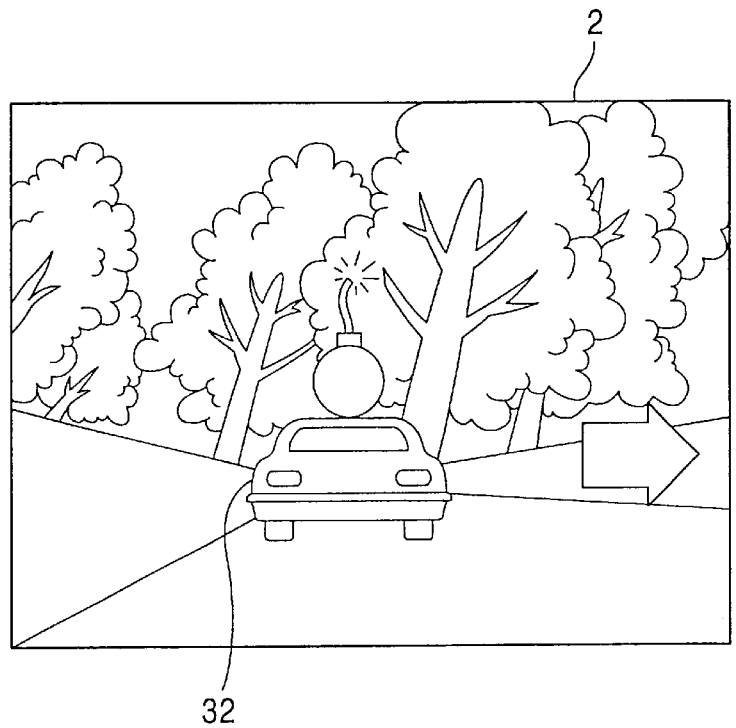
FIG. 8 is a drawing showing one game screen.

For example, when the player's car 32 is behind a tree as shown in FIG. 7, the viewpoint automatically approaches the player's car 32, so that the player's car 32 can be clearly seen again, as shown in FIG. 8.

Figure 9:
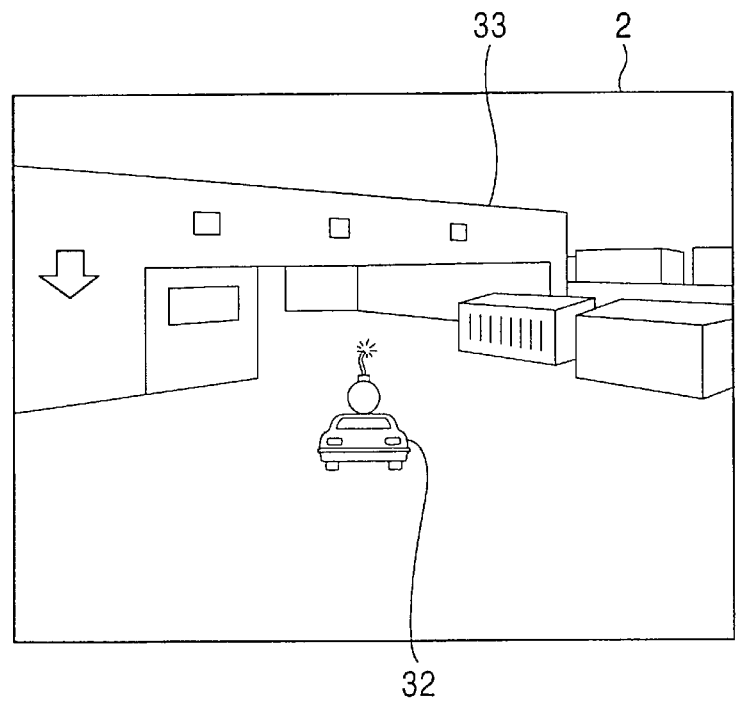
FIG. 9 is a drawing showing one game screen.
Figure 10:
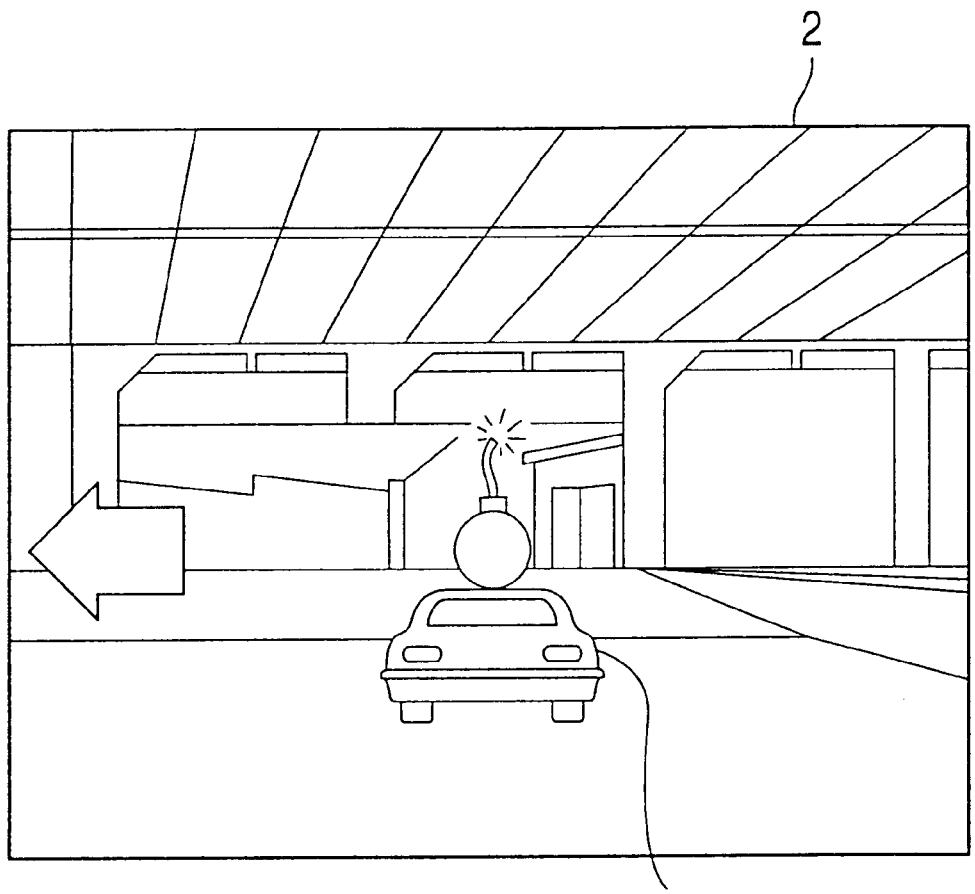
FIG. 10 is a drawing showing one game screen.

When the player's car 32 enters a warehouse 33 as shown in FIG. 9, the viewpoint automatically approaches and enters the warehouse 33 as shown in FIG. 9, so that the player's car 32 can be clearly seen again as shown in FIG. 10.

Figure 11:
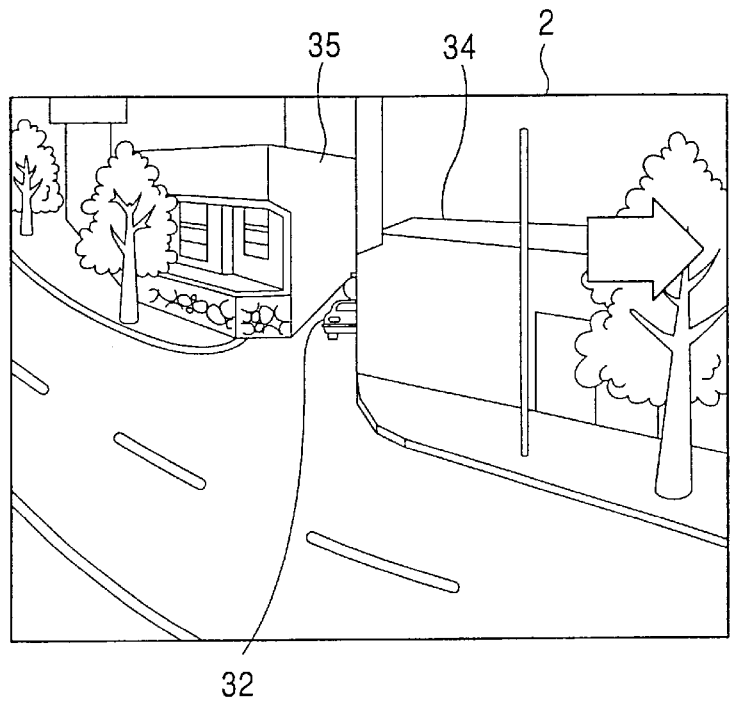
FIG. 11 is a drawing showing one game screen.
Figure 12:
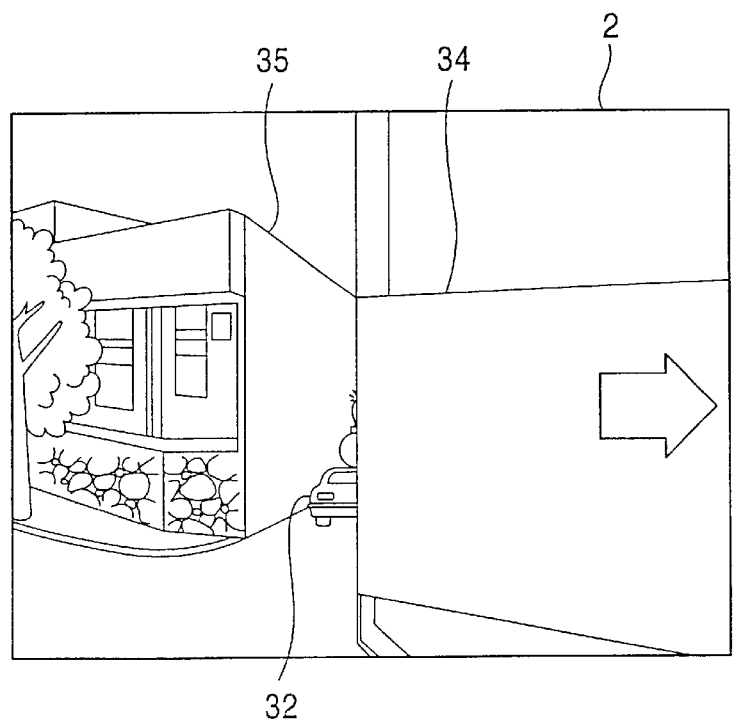
FIG. 12 is a drawing showing one game screen.
Figure 13:
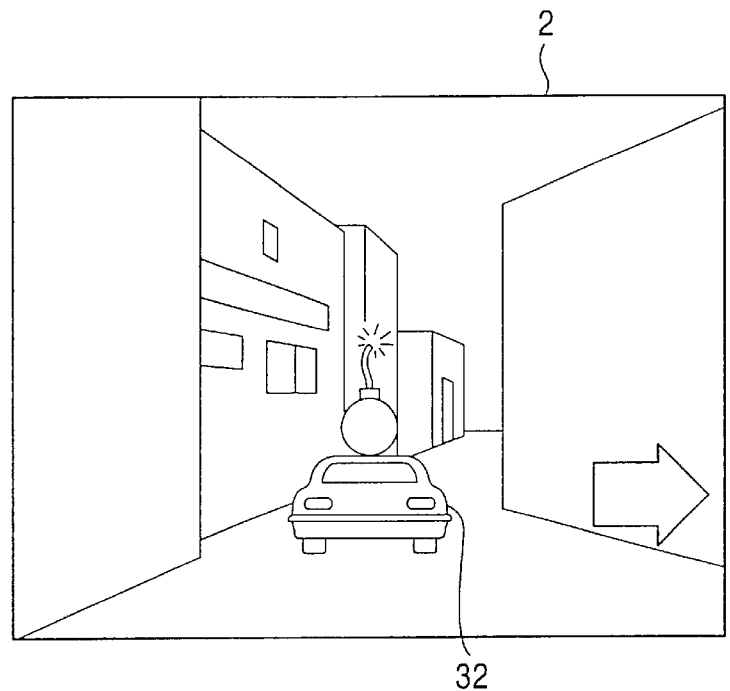
FIG. 13 is a drawing showing one game screen.

When the player's car 32 goes along an alley between buildings 34 and 35 as shown in FIG. 11, the viewpoint approaches the player's car 32 as shown in FIG. 12, and further approaches the player's car 32, so that the player's car 32 can be clearly seen again as shown in FIG. 13. This prevents the player from having a mistake in driving the player's car 32.

(4) If the position determination unit 253 has determined that the player's car 32 has spun, the viewpoint is positioned to be away from the player's car 32 by setting set point GP at 300, and moving speed MS at 3. This enables the player to view surroundings of the player's car 32, which is spinning, and prevents the player from losing a sense of direction. When a spin signal is sent from the position determination unit 253, the motion of the viewpoint to the rear of the player's car 32 is interrupted, and the viewpoint is fixed in the desired direction. This prevents the image displayed on the monitor 2 from rotating.

(5) When the player's car 32 is a tagger, and the enemy car 30 is detected in front of the player's car 32, the viewpoint is positioned to approach the player's car 32 by setting set point GP at 40, and moving speed MS at 5. This provides a clear, appealing image.

(6) When the enemy car 30 is a tagger, and the player's car 32 is detected, the viewpoint is positioned to be relatively away from the player's car 32 in accordance with distance D (shown in FIG. 4) between the enemy car 30 and the player's car 32 by setting set point GP at 100 to 275, and moving speed MS at 2. In FIG. 4, concerning set point GP, GP=100 if D<20, GP=225 if $20 \leq D<30$, GP=250 if $30 \leq D<40$, and GP=275 if $40 \leq D<50$. By using these settings, it is clear that the player's car 32 is being chased, and that the position of the player's car 32 is easily recognized.

(7) In the case where the above-described viewpoint conditions are not satisfied, and at a default option, the viewpoint is positioned at normal position P3 (shown in FIG. 5) by setting set point GP at 200, and moving speed MS at 2.

In this embodiment, closest point P1 is at a distance corresponding to approximately eight meters from the player's car 32, and farthest point P2 is at a distance corresponding to approximately forty meters from the player's car 32.

When the position of the viewpoint is ordinarily changed, only the two-dimensional coordinates (x, y) of the viewpoint are used to perform operations, and computation of a viewpoint moving distance is performed using only values based on the viewpoint, whereby an operation time can be reduced.

The arrows displayed on the monitor 2 (shown in FIGS. 7 to 14) represents a direction in which there is the enemy car 30.

Referring back to FIG. 1, the rendering unit 255 is described.

The rendering unit 255 has the following functions (1) to (4).

(1) The rendering unit 255 performs known three-dimensional image processing such as geometry or rendering to display, on the monitor 2, models such as the enemy car 30 detected by the position determination unit 253, buildings around a road and a field having streets in range of sight, by using the viewpoint at the position determined by the viewpoint-position control unit 254. When the rendering unit 255 displays the streets, etc., it displays a necessary range in the range of sight. When the direction of the player's car 32 changes, the coordinate data of the viewpoint revolve in the opposite direction to the direction of change, whereby a range in which the models appear is displayed.

(2) When a collision signal, a spin signal, or a crash signal is sent from the position determination unit 253, the rendering unit 255 displays a vibrating screen on monitor 2 by moving the position of the viewpoint.

(3) As shown in FIG. 21, the rendering unit 255 displays, above the automobile corresponding to the tagger, the time bomb Q having the lighted fuse 41 connected to a main part 42. If the position determination unit 253 has determined that the tagger is switched, the rendering unit 255 also moves the display position of the time bomb Q to above an automobile corresponding to the new tagger, as indicated by the two-dot chain line in FIG. 21.

(4) With an elapsed time from the game start measured, and the fuse 41 shortened at a predetermined rate in accordance with an elapse of time, when a predetermined time passes from the game start, the rendering unit 255 displays the image of the fuse 41, which is burnt, before displaying an image in which the time bomb Q has exploded.

The video game according to the present invention determines whether two automobiles touch each other, and determines based on contact that a tagger has switched. Accordingly, a video game machine can be applied to tag, which can enhance an interest in the game.

In addition, when two automobiles continue to touch each other for at least a predetermined time, the video game determines that the tagger has switched. Accordingly, if the two automobiles have touched each other a number of times in a short time, the time bomb Q cannot frequently move, which prevents the player from losing a clear view.

Figure 15:
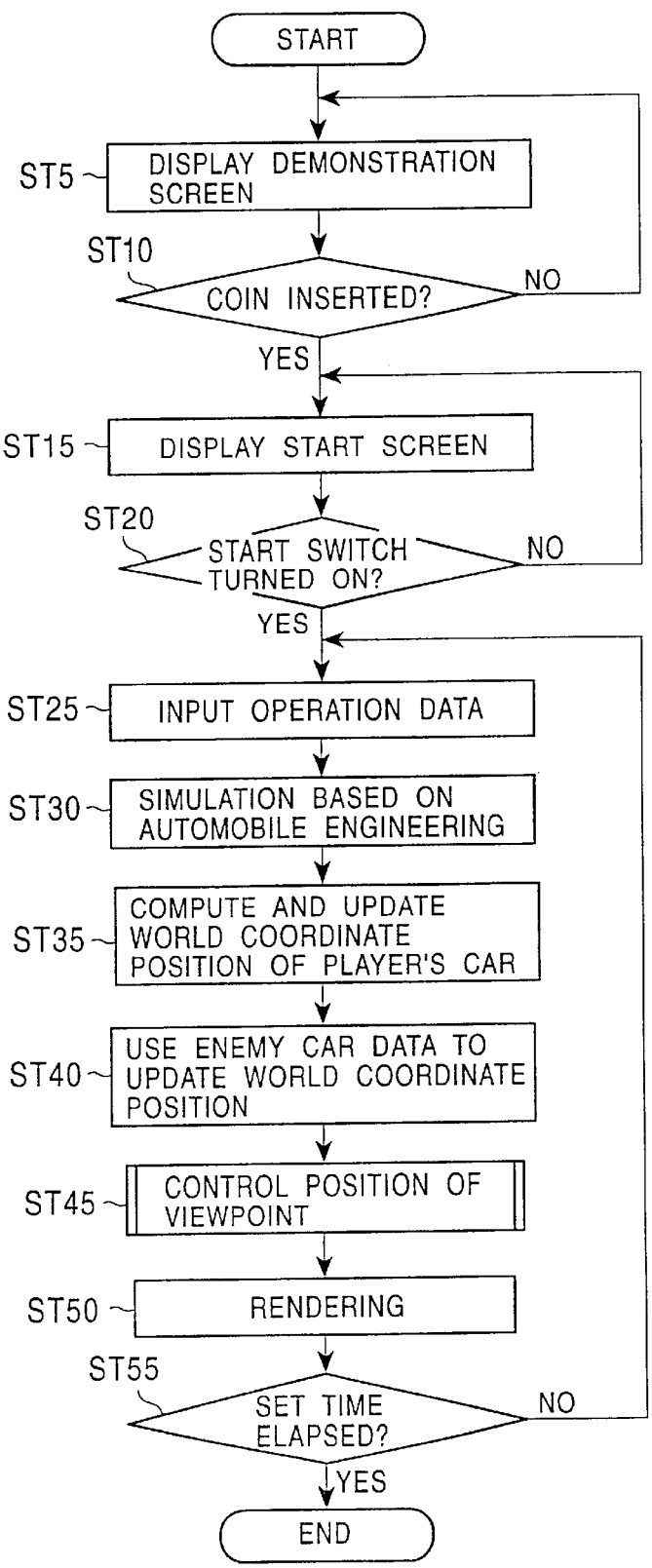
FIG. 15 is a flowchart illustrating a main-routine for a video game machine according to the present invention.

Next, a process for operation of the video game machine of the present invention is described. FIG. 15 shows a main routine performed in the video game machine.

When main power is supplied to the video game machine, the rendering unit 255 displays a demonstration screen on the monitor 2 (step ST5). The process determines whether a coin was inserted into the coin slot 8 (step ST10). If no coin was inserted ("NO" in step ST10), the demonstration screen in step ST5 is continuously displayed. If a coin was inserted ("YES" in step ST10), the rendering unit 255 displays a start screen (step ST15).

The process determines whether the start switch 9 was turned on (step ST20). If the start switch 9 was not turned on ("NO" in step ST20), the start screen in step ST15 is continuously displayed. If the start switch 9 was turned on ("YES" in step ST20), the game starts, and the player operates the driving operation unit 22 so that the player's car runs.

Operation data from each part of the driving operation unit 22 are input to the player's-car control unit 251 (step ST25). The input data are used to perform simulation based on automotive engineering in accordance with the automobile motion program stored in the ROM 23 (step ST30). Positional data on the world coordinates of the player's car determined in the simulation are updated (step ST35).

Based on enemy-car data received by the communication control unit 252, positional data on the player's car are updated (step ST40). Control of the position of the viewpoint (described below) is performed (step ST45). Based on the position and direction of the viewpoint determined in step ST45, the rendering unit 255 displays images on the monitor 2 by performing three-dimensional image processing (step ST50). The process determines whether a predetermined time from the game start has elapsed (step ST55). If the predetermined time has not passed ("NO" in step ST55), the process returns to step ST25, in which it performs the same processing to repeatedly control driving. If the predetermined time has elapsed ("YES" in step ST55), the process terminates.

The game may be started by inserting a coin, without turning on the start switch 9. The game may be terminated when the tagger is switched a predetermined number of times, even if the predetermined time has not passed.

Figure 16:
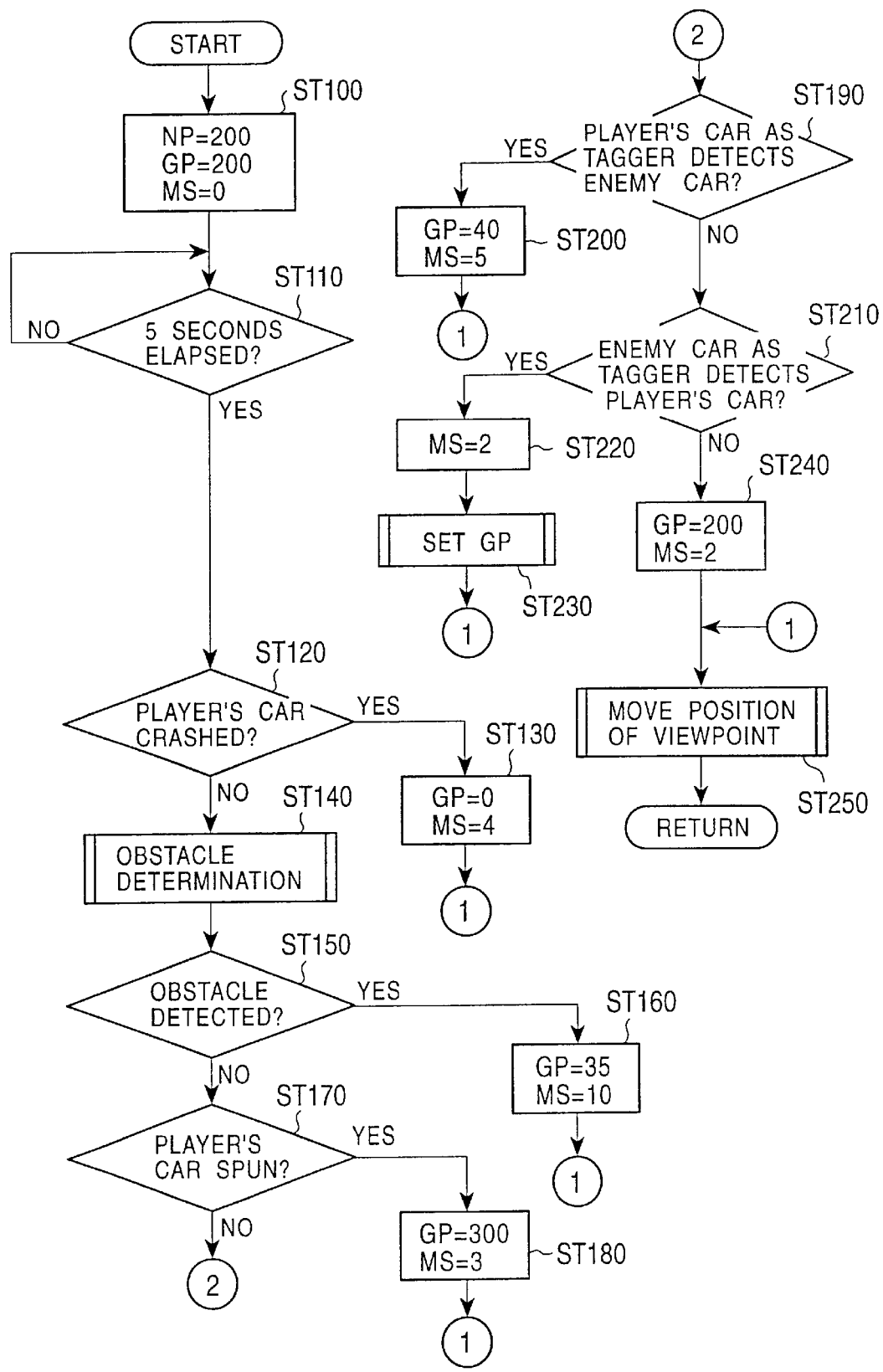
FIG. 16 is a flowchart illustrating a sub-routine process (step ST45 shown in FIG. 14) for controlling the position of a viewpoint.

FIG. 16 shows a flowchart of a sub-routine process for controlling the position of the viewpoint (step ST45 shown in FIG. 15).

At first, each data is set at an initial value. In other words, the present point NP of the viewpoint is set at 200, the set point GP as a target for moving the position of the viewpoint is set at 200, and the moving speed MS is set at zero (step ST100).

The process determines whether five seconds have elapsed (step ST110). Until five seconds elapse ("NO" in step ST110), the process does not proceed to the subsequent steps, and the position of the viewpoint is not controlled. If five seconds have elapsed ("YES" in step ST110), the process determines whether the player's car has crashed (step ST120).

If the player's car has crashed ("YES" in step ST120), the set point GP is set to zero, and the moving speed MS is set at 4 (step ST130) before the process proceeds to step ST250.

If the player's car has not crashed ("NO" in step ST120), obstacle determination (described below) is performed (step ST140). If, as a result of the determination, an obstacle is detected ("YES" in step ST150), the set point GP is set to 35, and the moving speed MS is set to 10 (step ST160) before the process proceeds to step ST250.

If no obstacle is detected ("NO" in step ST150), the process determines whether the player's car has spun (step ST170).

If the player's car has spun ("YES" in step ST170), the set point GP is set to 300, and the moving speed MS is set to 3 (step ST180) before the process proceeds to step ST250.

If the player's car has not spun ("NO" in step ST170), the process determines whether the enemy car is detected when the player's car is a tagger (step ST190). If the enemy car is detected ("YES" in step ST190), the set point GP is set to 40, and the moving speed MS is set to 5 (step ST200) before the process proceeds to step ST250.

If no enemy car is detected ("NO" in step ST190), the process determines whether the player's car is detected when the enemy car is a tagger (step ST210). If the player's car is detected ("YES" in step ST210), the moving speed MS is set to 2, and the setting of the set point GP (described below) is performed (step ST230) before the process proceeds to step ST250.

If the player's car is not detected ("NO" in step ST210), the set point GP is set to 200, and the moving speed MS is set to 2 (step ST240). The moving of the position of the viewpoint (described below) is performed (step ST250), and the process terminates.

Figure 17:
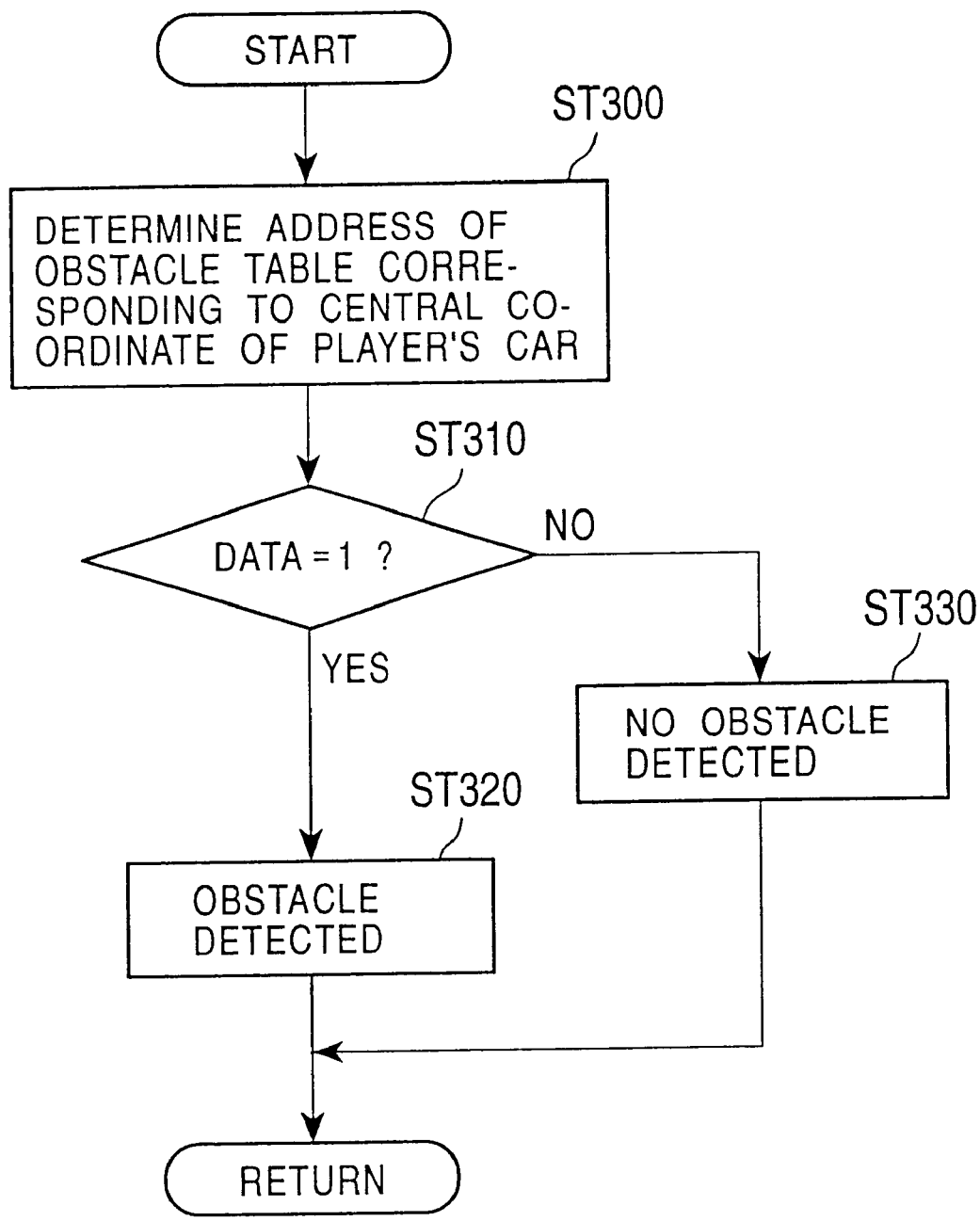
FIG. 17 is a flowchart illustrating a sub-routine process (step ST140 shown in FIG. 16) for obstacle determination.

FIG. 17 shows an obstacle determination sub-routine process (step ST140 shown in FIG. 16).

Initially, the process determines an address of the obstacle table 30 (shown in FIG. 2) which corresponds to the present central coordinates of the player's car in the world coordinate system (step ST300). The process determines whether data corresponding to the address is one (step ST310). If the data is one ("YES" in step ST310), the process determines that an obstacle is detected (step ST320). If the data is zero, the process determines that no obstacle is detected (step ST330) before the process terminates.

Figure 18:
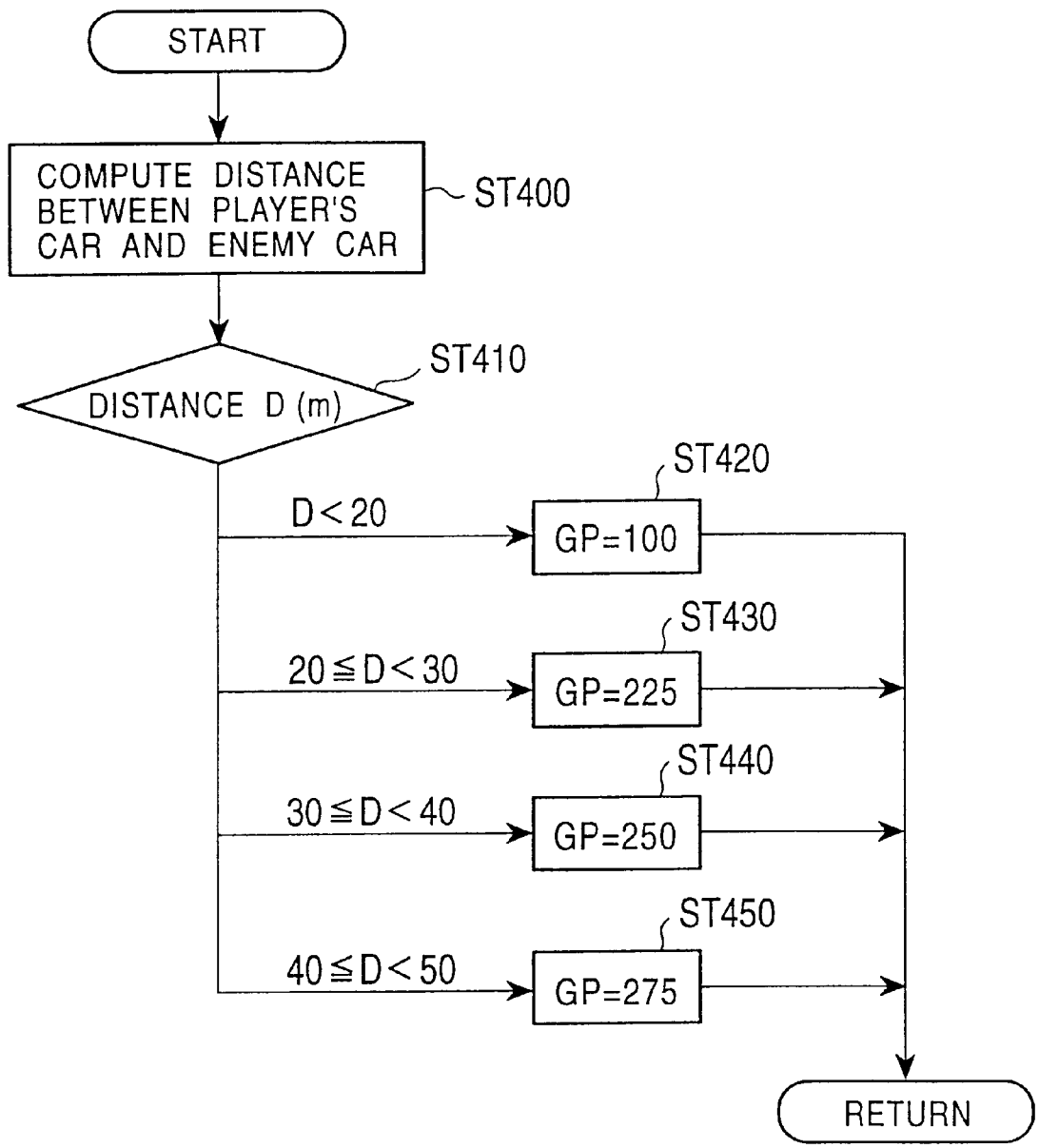
FIG. 18 is a flowchart illustrating a sub-routine process (step ST230 shown in FIG. 16) for setting set point GP.

FIG. 18 shows a sub-routine process (step ST230 shown in FIG. 16) for setting the set point GP.

Initially, distance D between the player's car and the enemy car is computed (step ST400). In accordance with distance D (step ST410), the setting of the set point GP is performed (steps ST420 to ST450).

Specifically, if distance D<20, the set point GP is set to 100 (step ST420). If 20≦distance D<30, the set point GP is set to 225 (step ST430). If 30≦distance D<40, the set point GP is set to 250 (step ST440). If 40≦distance D<50, the set point GP is set to 275 (step ST450).

Figure 19:
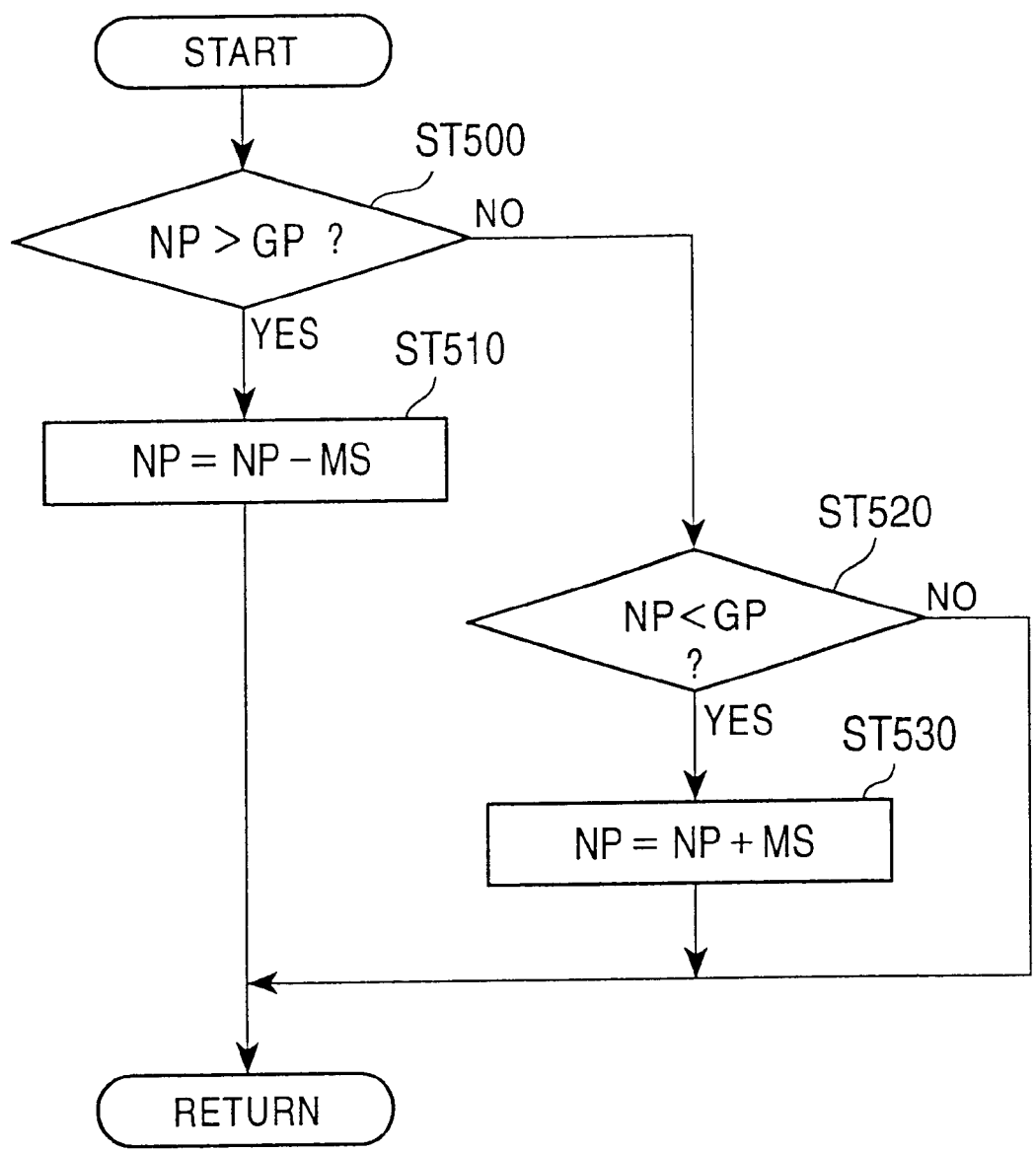
FIG. 19 is a flowchart illustrating a sub-routine process (step ST250 shown in FIG. 16) for moving the position of a viewpoint.

FIG. 19 shows a sub-routine process (step ST250 shown in FIG. 16) for moving the position of the viewpoint.

Initially, the process determines whether the present point NP is greater than the set point GP (step ST500). If the present point NP>the set point GP ("YES" in step ST500), operation the present point NP=the present point NP−the moving speed MS is performed (step ST510), and the process terminates.

If the present point NP≦the set point GP ("NO" in step ST500), the process determines whether the present point NP<the set point GP (step ST520). If the present point NP<the set point GP ("YES" in step ST520), operation the present point NP=the present point NP+the moving speed MS is performed (step ST530), and the process terminates.

If the relationship in which the present point NP<the set point GP does not hold ("NO" in step ST520), the present point NP=the set point GP, and the process accordingly terminates.

The present invention is not limited to the foregoing embodiment, but the following modifications (1) to (13) may be employed.

(1) The moving speed MS of the viewpoint may not be set at a constant value, but may be preferably increased or reduced in accordance with environments when the viewpoint is moved.

(2) In addition to the foregoing embodiment in which the viewpoint is linearly moved closer or away, the viewpoint may be horizontally or vertically moved so that an observation position can change depending on a game mode.

(3) In the foregoing embodiment, as shown in FIG. 5, the viewpoint 32 is relatively smoothly moved between closest position P1 and farthest position P2. However, if the viewpoint 32 is automatically moved, it does not need to be moved at intervals of viewpoint positions, but may be moved at two stages comprised of normal position P3 and each set point GP, or three stages including the intermediate position.

(4) Before it is determined that there is an obstacle between the viewpoint and the player's car, at least one of the moving direction and speed of the player's car is taken into consideration for determining that there may be an obstacle, whereby the viewpoint may be controlled so that its position can start to move just before the obstacle is detected. This enables a player's quick response.

(5) Concerning the ROM 23 as a recording medium, portable recording media such as CD-ROMs, optical disks, memory cards, and floppy disks, may be used, which makes it possible to facilitate game-program exchange or updating.

(6) A television set may be used as the monitor 2. Concerning the accelerator pedal 5, a hand-operable switch button may be used in place of a foot-operable pedal.

(7) In conditions excluding the case where there is an obstacle between the viewpoint and the player's car, in addition to the moving of the position of the viewpoint, the angle of view may be changed (zoomed) in accordance with each viewpoint condition. By way of example, when the position of the viewpoint is moved away from the player's car, the angle of view may be enlarged using the viewpoint-position control unit 254. This extends the view range, and makes it possible for the player to clearly view the surroundings of the player's car.

Figure 22A:
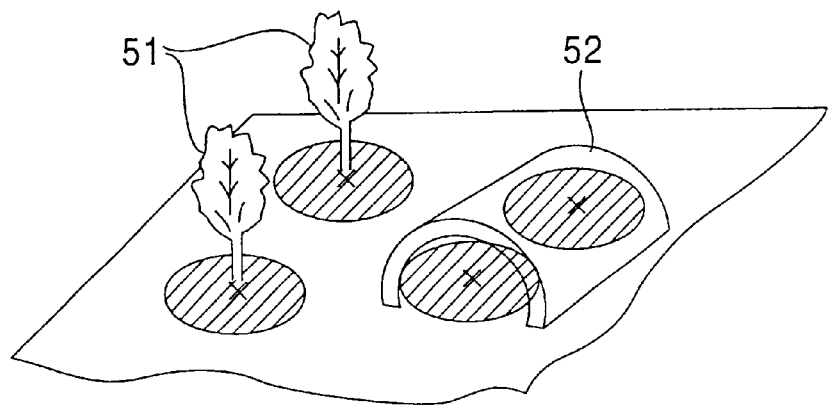
FIGS. 22A and 22B are drawings showing another technique for obstacle determination.
Figure 22B:
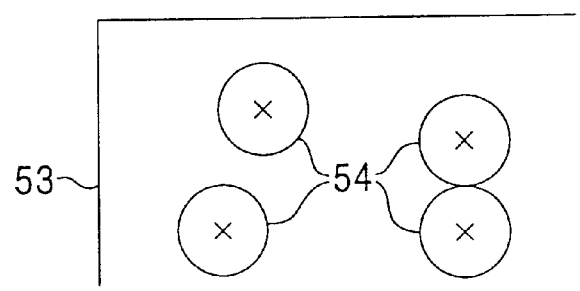

(8) The obstacle determination is not limited to techniques using the obstacle table 30 shown in FIG. 2. The obstacle determination may be performed by determining whether the coordinate data on the player's car are positioned within two-dimensional areas 54 after presetting areas having predetermined radii around obstacles, such as trees 51 and tunnels 52, as hatched in FIG. 22A, and storing, in the ROM 23, the two-dimensional areas 54 corresponding to the preset areas as shown in FIG. 22B.

(9) The present invention can be applied to not only an automobile game but also games in which a game character is moved and at least one action is performed by the game character, and various video games including obstacles (e.g., in games where a game character flies, mountains, clouds, other game characters, etc., are obstacles, and in games where a game character moves on the sea or in water, rocks, other game characters, weather conditions, etc., are obstacles), such as competition games and battle games.

(10) In the foregoing embodiment, the player's car spins or crashes due to contact or collision with the enemy car or a road. However, in the case where a moving object as a game character is a ship, the ship may be spun due to a tide or a swirl, and in the case where the moving object is a spaceship, the spaceship may be spun or crashed due to contact or collision with a meteorite or the like.

(11) In the foregoing embodiment, when the player's car crashes, the viewpoint is moved close to the player's car. However, the viewpoint may be moved away from the player's car. This enables the player to clearly view surroundings of the player's car, which prevents the player from losing sight of directions.

(12) In the foregoing embodiment, as shown in FIG. 6, when the player's car 32 crashes, by moving the viewpoint close to the player's car 32 from, for example, its position just before the crash, the viewpoint is positioned out of the back of the player's car 32. However, the viewpoint may be positioned behind the player's car 32, even when the player's car 32 crashes. Accordingly, the direction of the player's car 32 when it crashes can be clarified.

Figure 14:
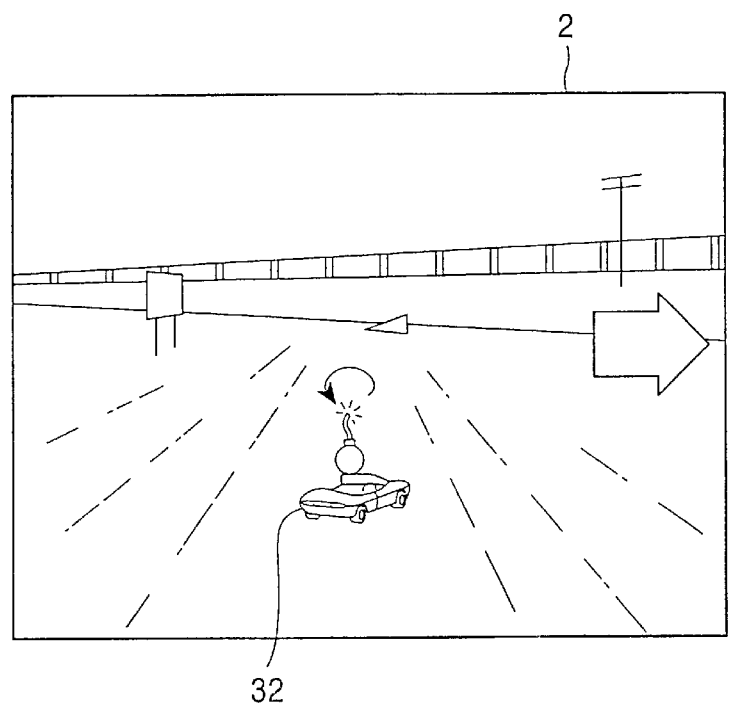
FIG. 14 is a drawing showing one game screen.

(13) In the foregoing embodiment, as shown in FIG. 14, when the player's car 32 spins, by moving the viewpoint away from its position just before the spin, the viewpoint is positioned out of the back of the player's car 32. However, also when the player's car 32 spins, the viewpoint is positioned behind the player's car 32 until the spin ends, or in the middle of the spin. This displays a spinning image on the monitor 2, which can enhance the virtual reality of spinning.

What is claimed is:

1. A video game machine comprising:
   operation means for outputting an operation signal when said operation means is externally operated, said operation signal corresponding to a type of operation;
   motion-control means for moving a game character in a game space in accordance with said operation signal;
   rendering means for displaying, on a displaying means, an image including said game character using a predetermined position set with respect to said game character as a viewpoint;
   condition storage means for storing viewpoint conditions and corresponding selected predetermined positions relative said game character for use as said predetermined position, wherein said viewpoint conditions are dynamic conditions of said game character based on movement of said game character in response to said operation signal during continuous execution of gaming;
   condition determination means for determining whether ones of said viewpoint conditions are satisfied; and
   viewpoint-position control means for moving the viewpoint to from a present predetermined position to one of the selected predetermined positions corresponding to one of said viewpoint conditions at one of predetermined viewpoint moving speeds associated with said one of said viewpoint conditions when said one of said viewpoint conditions is satisfied.

2. A video game machine according to claim 1, wherein said one of said viewpoint conditions is provided for an action by said game character.

3. A video game machine according to claim 2, wherein said game character is a moving object, and said one of said viewpoint conditions is that said moving object has spun.

4. A video game machine according to claim 3, wherein said viewpoint is provided behind said game character which is moving.

5. A video game machine according to claim 2, wherein said game character is a moving object, and said one of said viewpoint conditions is that said moving object has crashed.

6. A video game machine according to claim 5, wherein said viewpoint is provided behind said game character which is moving.

7. A video game machine according to claim 2, wherein said viewpoint is provided behind said game character which is moving.

8. A video game machine according to claim 1, wherein:
   said one of said viewpoint conditions is provided based on a positional relationship between a predetermined obstacle provided in said game space and said game character, and
   said condition determination means determines that said one of said viewpoint conditions is satisfied when said game character is positioned within a predetermined range of the predetermined obstacle.

9. A video game machine according to claim 8, further including table storage means for storing a table provided for coordinates in said game space, and an area corresponding to said predetermined range in said table,
   wherein said condition determination means determines said one of said viewpoint conditions is satisfied based on the correspondence between the coordinates of said game character in said game space and said area.

10. A video game machine according to claim 8, further including range storage means for storing coordinates in said predetermined range in said game space,
    wherein said condition determination means determines said one of said viewpoint conditions is satisfied when the coordinates of said game character in said game space are included in said predetermined range.

11. A video game machine according to claim 8, wherein said viewpoint is provided behind said game character which is moving.

12. A video game machine according to claim 1, wherein said one of said viewpoint conditions is provided based on a positional relationship between a predetermined obstacle provided in said game space and said game character, and
    said condition determination means determines that said one of said viewpoint conditions is satisfied when said predetermined obstacle is positioned between said game character and a present predetermined position of said viewpoint.

13. A video game machine according to claim 12, wherein said viewpoint is provided behind said game character which is moving.

14. A video game machine according to claim 1, wherein said viewpoint is provided behind said game character which is moving.

15. A video game machine according to claim 1, wherein said viewpoint conditions correspond to events occurring during continuous play of said game.

16. A video game machine according to claim 15, wherein said condition storage means stores said predetermined viewpoint moving speeds associated with corresponding ones of said viewpoint conditions.

17. A video game machine according to claim 1, wherein said condition storage means stores said predetermined viewpoint moving speeds associated with corresponding ones of said viewpoint conditions.

18. A video game machine display method, comprising the steps of:

storing viewpoint conditions, corresponding selected predetermined positions set relative to a game character, and associated viewpoint moving speeds for moving a viewpoint to the selected predetermined positions, wherein said viewpoint conditions are dynamic conditions of said game character based on movement of said game character in response to said operation signal during continuous execution of gaming;

displaying an image including said game character as viewed from a viewpoint set relative to said game character;

moving said game character in a game space in accordance with an operation signal;

determining whether ones of said viewpoint conditions are satisfied; and moving the viewpoint to from a present predetermined position to one of the selected predetermined positions corresponding to one of said viewpoint conditions at one of said viewpoint moving speeds associated with said one of said viewpoint conditions when said one of said viewpoint conditions is satisfied.

19. A video game machine display method according to claim 18, wherein said viewpoint conditions correspond to events occurring during continuous play of said game.

20. A video game machine display method according to claim 18, wherein said one of said viewpoint conditions is provided for an action by said game character.

21. A video game machine display method according to claim 20, wherein said game character is a moving object, and said one of said viewpoint conditions is that said moving object has spun.

22. A video game machine display method according to claim 20, wherein said game character is a moving object, and said one of said viewpoint conditions is that said moving object has crashed.

23. A video game machine display method according to claim 18, wherein:

said one of said viewpoint conditions is provided based on a positional relationship between a predetermined obstacle and said game character, and said determining determines that said one of said viewpoint conditions is satisfied when said game character is positioned within a predetermined range of the predetermined obstacle.

24. A video game machine display method according to claim 18, wherein:

said one of said viewpoint conditions is provided based on a positional relationship between a predetermined obstacle and said game character, and said determining determines that said one of said viewpoint conditions is satisfied when said predetermined obstacle is positioned between said game character and a present predetermined position of said viewpoint.

25. A video game machine display method according to claim 18, wherein said viewpoint is provided behind said game character and said game character is moving.

26. A recording medium containing an executable program for performing a video game machine display method, the video game machine display method comprising the steps of:

storing viewpoint conditions, corresponding selected predetermined positions set relative to a game character, and associated viewpoint moving speeds for moving a viewpoint to the selected predetermined positions, wherein said viewpoint conditions are dynamic conditions of said game character based on movement of said game character in response to said operation signal during continuous execution of gaming;

displaying an image including said game character as viewed from a viewpoint set relative to said game character;

moving said game character in a game space in accordance with an operation signal;

condition determination means for determining whether ones of said viewpoint conditions are satisfied; and moving the viewpoint to from a present predetermined position to one of the selected predetermined positions corresponding to one of said viewpoint conditions at one of said viewpoint moving speeds associated with said one of said viewpoint conditions when said one of said viewpoint conditions is satisfied.

27. The recording medium according to claim 26, wherein said viewpoint conditions correspond to events occurring during continuous play of said game.

28. The recording medium according to claim 26, wherein said one of said viewpoint conditions is provided for an action by said game character.

29. The recording medium according to claim 28, wherein said game character is a moving object, and said one of said viewpoint conditions is that said moving object has spun.

30. The recording medium according to claim 28, wherein said game character is a moving object, and said one of said viewpoint conditions is that said moving object has crashed.

31. The recording medium according to claim 26, wherein:

said one of said viewpoint conditions is provided based on a positional relationship between a predetermined obstacle and said game character, and said determining determines that said one of said viewpoint conditions is satisfied when said game character is positioned within a predetermined range of the predetermined obstacle.

32. The recording medium according to claim 26, wherein:

said one of said viewpoint conditions is provided based on a positional relationship between a predetermined obstacle and said game character, and said determining determines that said one of said viewpoint conditions is satisfied when said predetermined obstacle is positioned between said game character and a present predetermined position of said viewpoint.

33. The recording medium according to claim 26, wherein said viewpoint is provided behind said game character and said game character is moving.

34. A video game machine for use by a player to play a game, comprising:

operation means for outputting an operation signal corresponding to an external operation by the player;

motion-control means for moving a game character in a game space in accordance with said operation signal;

rendering means for displaying, on a display, an image including said game character as viewed from a viewpoint set positioned relative to said game character;

condition storage means for storing viewpoint conditions corresponding to dynamic events of said game character based on movement of said game character in response to said operation signal during continuous execution of said game and corresponding selected predetermined positions set relative to said game character for use as the viewpoint when corresponding ones of said viewpoint conditions occur;

condition determination means for determining when ones of said viewpoint conditions is satisfied; and viewpoint-position control means for moving the viewpoint to from a present predetermined position to one of said selected predetermined positions corresponding to one of said viewpoint conditions when said condition determination means determines said one of said viewpoint conditions is satisfied during the continuous play of said game.

35. The video game machine according to claim 34, wherein said one of said viewpoint conditions is provided for an action by said game character.

36. The video game machine according to claim 35, wherein said game character is a moving object, and said one of said viewpoint conditions is that said moving object has spun.

37. The video game machine according to claim 35, wherein said game character is a moving object, and said one of said viewpoint conditions is that said moving object has crashed.

38. The video game machine according to claim 34, wherein:

said one of said viewpoint conditions is provided based on a positional relationship between a predetermined obstacle provided in said game space and said game character, and said condition determination means determines that said one of said viewpoint conditions is satisfied when said game character is positioned within a predetermined range of the predetermined obstacle.

39. The video game machine according to claim 38, further including table storage means for storing a table provided for coordinates in said game space, and an area corresponding to said predetermined range in said table, wherein said condition determination means determines said one of said viewpoint conditions is satisfied based on the correspondence between the coordinates of said game character in said game space and said area.

40. The video game machine according to claim 38, further including range storage means for storing coordinates in said predetermined range in said game space, wherein said condition determination determines said one of said viewpoint conditions is satisfied when the coordinates of said game character in said game space are included in said predetermined range.

41. The video game machine according to claim 34, wherein said one of said viewpoint conditions is provided based on a positional relationship between a predetermined obstacle provided in said game space and said game character, and said condition determination means determines that said one of said viewpoint conditions is satisfied when said predetermined obstacle is positioned between said game character and a present predetermined position of said viewpoint.

42. The video game machine according to claim 34, wherein said viewpoint is provided behind said game character and said game character is moving.

43. The video game machine according to claim 34, wherein:

said condition storage means stores viewpoint moving speeds for moving the viewpoint to corresponding ones of the selected predetermined positions; and said viewpoint-position control means moves the viewpoint from the present predetermined position to said one of the selected predetermined positions at one of said viewpoint moving speeds associated with said one of said viewpoint conditions when said one of said viewpoint conditions is satisfied.

44. A video game machine for use by a player, comprising:

operation means for outputting an operation signal corresponding to an external operation by the player;

motion-control means for moving a game character in a game space in accordance with said operation signal;

rendering means for displaying, on a display, an image including said game character as viewed from a viewpoint set relative to said game character;

condition storage means for storing viewpoint conditions and corresponding selected predetermined positions set relative to said game character and associated viewpoint moving speeds for moving the viewpoint to the selected predetermined positions, wherein said viewpoint conditions are dynamic conditions of said game character based on movement of said game character in response to said operation signal during continuous execution of gaming;

condition determination means for determining whether ones of said viewpoint conditions are satisfied; and viewpoint-position control means for moving the viewpoint from a present predetermined position to one of the selected predetermined positions corresponding to one of said viewpoint conditions at one of said viewpoint moving speeds associated with said one of said viewpoint conditions when said one of said viewpoint conditions is satisfied.

45. The video game machine according to claim 44, wherein said one of said viewpoint conditions is provided for an action by said game character.

46. The video game machine according to claim 45, wherein said game character is a moving object, and said one of said viewpoint conditions is that said moving object has spun.

47. The video game machine according to claim 45, wherein said game character is a moving object, and said one of said viewpoint conditions is that said moving object has crashed.

48. The video game machine according to claim 44, wherein:

said one of said viewpoint conditions is provided based on a positional relationship between a predetermined obstacle provided in said game space and said game character, and said condition determination means determines that said one of said viewpoint conditions is satisfied when said game character is positioned within a predetermined range of the predetermined obstacle.

49. The video game machine according to claim 48, further including table storage means for storing a table provided for coordinates in said game space, and an area corresponding to said predetermined range in said table, wherein said condition determination means determines said one of said viewpoint conditions is satisfied based on the correspondence between the coordinates of said game character in said game space and said area.

50. The video game machine according to claim 48, further including range storage means for storing coordinates in said predetermined range in said game space, wherein said condition determination determines said one of said viewpoint conditions is satisfied when the coordinates of said game character in said game space are included in said predetermined range.

51. The video game machine according to claim 44, wherein said one of said viewpoint conditions is provided based on a positional relationship between a predetermined obstacle provided in said game space and said game character, and said condition determination means determines that said one of said viewpoint conditions is satisfied when said predetermined obstacle is positioned between said game character and a present predetermined position of said viewpoint.

52. The video game machine according to claim 40, wherein said viewpoint is provided behind said game character and said game character is moving.

* * * * *